United States Patent [19]
Faulkner, III et al.

[11] Patent Number: 6,039,217
[45] Date of Patent: Mar. 21, 2000

[54] APPARATUS AND METHOD FOR THERMOPLASTIC MATERIAL HANDLING

[75] Inventors: W. Harrison Faulkner, III, Salinas; David Bullock; Dennis DeGray, both of Pacific Grove; Neil Sarasohn, Aptos, all of Calif.

[73] Assignee: Nordson Corporation, Westlake, Ohio

[21] Appl. No.: 09/056,601

[22] Filed: Apr. 7, 1998

[51] Int. Cl.[7] .................................................. B67D 5/63
[52] U.S. Cl. .................. 222/146.5; 222/152; 222/156; 222/189.06; 222/397
[58] Field of Search .................... 222/146.5, 189.06, 222/189.01, 396, 397, 152, 156, 318

[56] References Cited

U.S. PATENT DOCUMENTS

| | | | |
|---|---|---|---|
| 509,257 | 11/1893 | Sommer | 432/156 |
| 769,052 | 8/1904 | Brayshaw | 432/158 |
| 1,451,538 | 4/1923 | Engel | 454/49 |
| 1,896,951 | 2/1933 | Hahn | 454/49 |
| 2,190,068 | 2/1940 | Henschler | 4/213 |
| 2,247,891 | 7/1941 | Schneible | 98/115 |

(List continued on next page.)

FOREIGN PATENT DOCUMENTS

| | | |
|---|---|---|
| 0715142 A1 | 5/1996 | European Pat. Off. . |
| 463041 | 4/1951 | Germany . |
| 1148368 | 5/1963 | Germany . |
| 4307867 A1 | 6/1994 | Germany . |
| 318044 | 12/1917 | Italy . |
| 01203034 | 8/1989 | Japan . |
| 854147 | 11/1960 | United Kingdom . |
| 2077419 | 12/1981 | United Kingdom . |

OTHER PUBLICATIONS

Slautterback, *Autotech*, Brochure, 1997.
Slautterback, *HotMelt Applicator Systems*, Brochure, 1996.
Nordson, *AquaGuard™ Systems*, Brochure, 1992.
Meltex® Information, *PUR–Hot Melt Applicators*, Brochure, Sep. 1988.
Nordson, *Meltex® Hot Melt Lab Coater CL 2016*, Brochure, 1996.
Nordson, *1996 Adhesive and Sealants Equipment Catalog*, 1996.
Slautterback, *Autotech® Melt Unit Series Operation Manual*, 1998.

*Primary Examiner*—Kenneth Bomberg
*Attorney, Agent, or Firm*—Wood, Herron & Evans, L.L.P.

[57] ABSTRACT

A thermoplastic material melting and dispensing apparatus includes a hopper, a melting grid, and a lid assembly which vents the interior of the hopper in an over pressure situation. Specifically, the lid assembly may be mounted with a spring-loaded hinge mechanism and may include a spring-loaded latch mechanism which each allow the lid to move upwardly away from a gas seal in the event that the gas pressure within the hopper exceeds a predetermined amount. The apparatus further includes a gas purging system which constantly circulates a gas, such as nitrogen, within the hopper interior. This gas purging system may include a solenoid valve which opens to allow exhaustion of pressurized gas from the hopper interior and the introduction of gas from a pressurized supply. A melting grid is provided which includes an surface with grooves communicating with a central outlet. The central outlet includes a plug and filter assembly which maintains solid thermoplastic material out of the outlet and filters melted thermoplastic material flowing through the outlet. A raised sealing element is provided on the lid assembly to maintain an airtight seal, and to also maintain opposed surfaces of the lid and the lid mounting portion in spaced apart relation. An advantageous flow control block with a pressure relief is connected to the thermoplastic material outlet.

30 Claims, 7 Drawing Sheets

U.S. PATENT DOCUMENTS

| | | | |
|---|---|---|---|
| 2,247,892 | 7/1941 | Schneible | 98/115 |
| 2,606,016 | 8/1952 | Lindh et al. | 266/38 |
| 2,942,540 | 6/1960 | Lundy | 98/115 |
| 3,564,990 | 2/1971 | Smedes | 98/115 |
| 3,638,673 | 2/1972 | Stanciu | 137/205 |
| 3,756,582 | 9/1973 | Overmyer et al. | 266/15 |
| 3,822,872 | 7/1974 | Nell | 266/19 |
| 3,853,410 | 12/1974 | Busoni | 222/146.5 X |
| 3,930,641 | 1/1976 | Overmyer et al. | 266/16 |
| 4,023,943 | 5/1977 | Kipple et al. | 55/304 |
| 4,154,368 | 5/1979 | Gusmer et al. | 222/146.5 X |
| 4,456,151 | 6/1984 | Lewellen | 222/146 |
| 4,485,942 | 12/1984 | Petrecca | 222/146.5 |
| 4,538,542 | 9/1985 | Kennon et al. | 118/302 |
| 4,771,920 | 9/1988 | Boccagno et al. | 222/146.5 |
| 4,796,601 | 1/1989 | Yamada | 126/299 |
| 4,848,420 | 7/1989 | Claassen | 141/82 |
| 5,238,468 | 8/1993 | Gabryszewski et al. | 95/267 |
| 5,332,125 | 7/1994 | Schmitkons et al. | 222/146.5 X |
| 5,338,248 | 8/1994 | Sumrack | 454/49 |
| 5,353,945 | 10/1994 | Frates et al. | 222/146.5 X |
| 5,518,221 | 5/1996 | Zurecki et al. | 266/44 |
| 5,535,920 | 7/1996 | Blair, Jr. et al. | 222/146.5 X |
| 5,711,289 | 1/1998 | Gabryszewski | 126/284 |

APPARATUS AND METHOD FOR THERMOPLASTIC MATERIAL HANDLING

FIELD OF INVENTION

The present invention relates generally to thermoplastic material melting and dispensing units, such as so-called hot melt adhesive melting and dispensing apparatus. Although applicable for use with many materials, the invention relates to a unit particularly useful with polyurethane reactive adhesives (PUR) adhesives.

BACKGROUND OF THE INVENTION

Hot melt adhesives are typically thermoplastic adhesives that are solid at room temperature, but and must be melted prior to use. Hot melt adhesives may be used for coating substrates during the sealing of packages, and may be used during such diverse activities as building construction, shoe manufacturing, and bookbinding. In addition, many uses exist in the assembly of automobile parts, electronics, electrical equipment, appliances, electrical components, furniture and other widely ranging manufacturing processes. The common forms of hot melt adhesives include, for example, polyamide adhesives, pressure sensitive adhesives (PSA), ethyl vinyl acetate (EVA), polyurethane reactive adhesives (PUR), and other animal based adhesives. The present invention relates most specifically to PUR adhesives, however, its various aspects are applicable to other types of meltable thermoplastic materials as used in many circumstances, such as those mentioned above.

PUR adhesives cure in the presence of ambient moisture. Typically, this type of adhesive may be supplied in a solid slug form, such as in the shape of a solid cylinder of material. A cylindrical melting hopper is often used to contain this slug of adhesive and a melting grid is typically disposed at the bottom of the hopper to gradually melt the material. The melted material flows from a hopper outlet, which communicates directly or indirectly with the melting grid, and a pump is typically used to dispense the melted material, for example, from a dispensing gun. After PUR material is melted, but before it is dispensed during a manufacturing operation, the material must be maintained in a substantially dry environment to prevent curing. Moisture in the air space contained at the top of a melting hopper can lead to undesirable curing of the material within this space. Gas injection or blanket or purge systems have been attempted to maintain this upper air space in a dry state, such as by using injected dry nitrogen gas. A dangerous condition can exist, however, if the injection of dry gas is sustained into an over pressure condition. Also, if the gas purge system does not have an effective warning system to indicate a low gas pressure condition, then the dry environment of the hopper could be compromised without the knowledge of the operator.

Other problems in the hot melt dispensing art relate to the melting grid used at the bottom of the hopper. These melting grids must communicate either directly or indirectly with an outlet for the melted thermoplastic material. The outlet must also remain unobstructed by the solid, unmelted hot melt material. In many cases, it is most desirable to have the slug of thermoplastic material disposed directly on the melting grid and over the outlet. However, this general type of design can lead to obstruction of the outlet. While various grid structures have been used to help ensure that the outlet remains unobstructed, there remains a need for improvements in this area of the hot melt unit, for example, to ease maintenance and clean up associated with the melting grid.

Various additional problems exist in this area of technology. Therefore, it would be desirable to provide a thermoplastic material melting and dispensing apparatus which incorporates various improvements related to the above concerns as well as other problems associated with this technology.

SUMMARY OF THE INVENTION

The present invention therefore provides a thermoplastic material handling device including a melting and dispensing unit generally having a hopper with an open upper end and a heating element, such as a melting grid, disposed at the lower end. In accordance with one aspect of the invention, a lid is mounted adjacent the open end of the hopper and is movable between at least three positions. One position is a fully open position for loading thermoplastic material in an unmelted form into the hopper and another position is a fully closed and sealed position for melting and dispensing the thermoplastic material. The third position is a venting position which allows the release of a build-up of gas pressure within the hopper. More specifically, pressure release structure is connected with the lid and operates to allow movement of at least a portion of the lid to the venting position under a predetermined pressure. In the preferred embodiment, the pressure release structure includes spring-loaded hinge and latch assemblies. This pressure release structure prevents various failures that might occur if typical pressure sensors and/or relief valves were used for this purpose. The spring-loaded assemblies of the preferred embodiment may be designed so that under a predetermined pressure, such as about 5 psi, the springs will allow the lid to move to the venting position. This may be necessary, for example, in a situation where a low pressure regulator connected to a pressurized gas supply fails while the gas supply is connected to the hopper.

In another aspect of the invention, a unique gas purging system is incorporated into the thermoplastic material melting and dispensing apparatus. This gas purging system generally includes a gas inlet and a gas outlet communicating with an air space in an upper interior portion of the hopper. The gas inlet and outlet are advantageously angled away from each other to promote full circulation. Preferably, each is angled downwardly, such as at 45°. A supply of gas, such as dry nitrogen, is connected to the gas inlet. A pressure sensing device is connected to the outlet for sensing gas pressure within the upper interior portion of the hopper. For example, if a low pressure condition exists, such as when the lid is open or the gas supply is shut off or depleted, a warning signal may be sent to the control panel of the unit causing an indicator light to alert personnel to the condition. A pump control may also be activated by the pressure sensing device to stop any dispensing of material. A gas flow regulating device is also preferably connected to the gas purging system for regulating the flow of gas within the air space. This gas flow regulating device may be a solenoid valve connected to the gas outlet of the hopper.

This valve is opened to allow pressurized gas to flow through the upper interior air space of the hopper from the gas supply when the lid has been closed. A switch, such as a microswitch, may be activated by the lid assembly and operatively connected with the gas flow regulating device to initiate a timed operation of the valve when the lid is in a closed position.

A unique sealing structure is also incorporated into the lid assembly and includes a raised sealing element which preferably maintains most of the opposing lid assembly surfaces spaced apart when the lid is in the closed position. Thus, material on these opposing surfaces is less likely to interfere with the seal formed by the lid assembly. Also, the raised sealing element provides an increased sealing pressure. Preferably, the underside of the lid includes a raised sealing element and this element engages a resilient sealing element disposed around the open end of the hopper. As an additional advantage, the raised sealing element on the underside of the lid is formed on a replaceable ring. In this way, the ring may be easily replaced if the sealing element is damaged. As still another advantage of the invention, the lid includes a viewing window to allow the operator to visually inspect the contents of the hopper. This will prevent opening of the lid and the resulting ingress of moisture. It can also eliminate the need for expensive level sensing components.

Finally, a flow control block is provided as part of the invention and includes an advantageous pressure relief feature and low dead space design for easier cleaning and maintenance, especially if thermoplastic material cures within the block.

Methods of operating a thermoplastic material handling unit are also disclosed in connection with the inventive concepts discussed herein.

These and other advantages and objectives of the invention will become more readily apparent to those of ordinary skill in the art upon review of the following detailed description taken in conjunction with the accompanying drawings.

DETAILED DESCRIPTION OF THE PREFERRED EMBODIMENT

Figure 1:
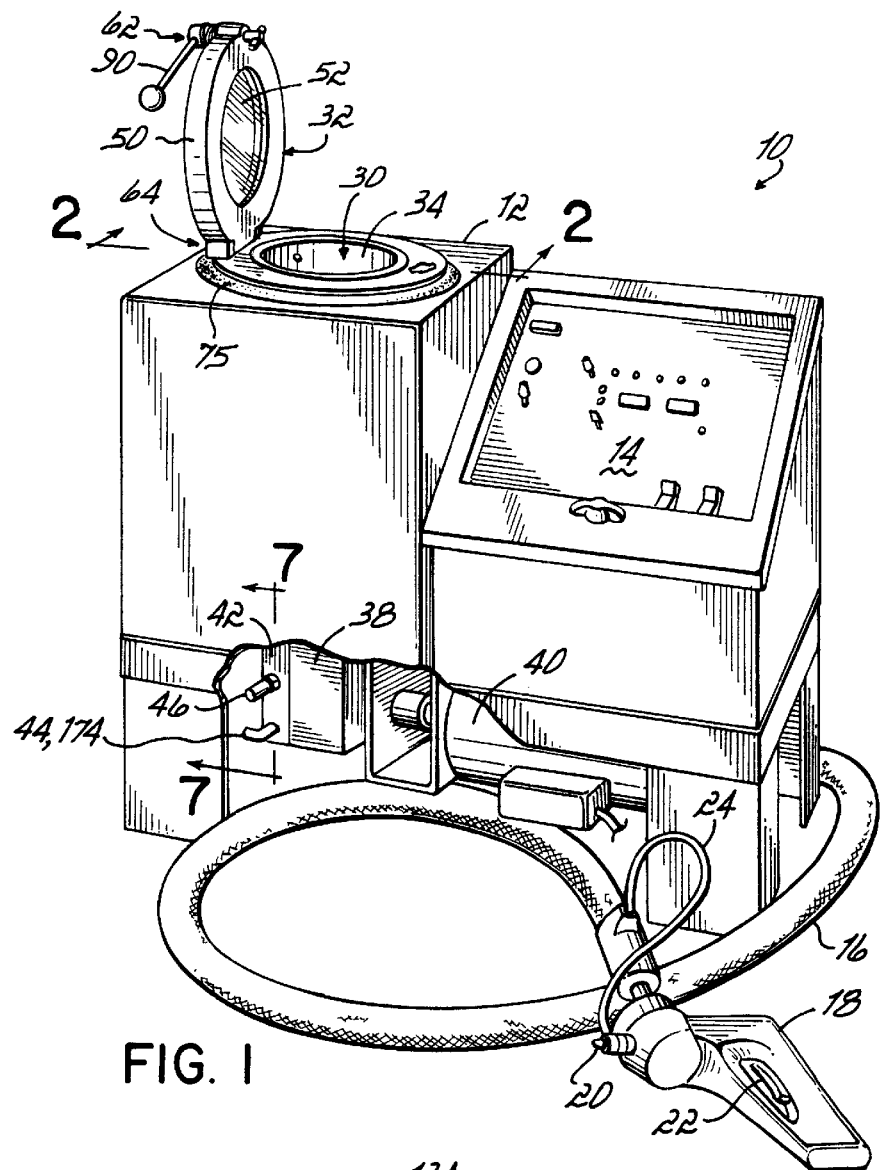
FIG. 1 is a perspective view of a thermoplastic material melting and dispensing apparatus formed as one preferred embodiment of this invention.

Referring generally to FIG. 1, an apparatus 10 is illustrated and is especially useful for melting and dispensing PUR or other hot melt materials in which a controlled interior dispensing environment is desirable. Although described with respect to its preferred use with PUR materials, it will be understood that apparatus 10, and variations thereof within the scope of the invention, may also be suitable for handling other types of thermoplastic materials that must be melted prior to use. Apparatus 10 generally comprises a melting and dispensing unit 12 and a control unit 14. A hose 16, which may be a standard RTD-controlled heated hose, is connected with the melting and dispensing unit 12 at one end (not shown) and includes a dispensing gun 18 at the opposite end. Gun 18 may include a dispensing nozzle 20 for dispensing thermoplastic adhesive material in various forms. In this regard, a trigger 22 opens a valve mechanism (not shown) within gun 18, for example, to dispense a bead of adhesive from nozzle 20. An air hose 24 may optionally be connected to nozzle 20 for creating various types of known swirl patterns. Of course, many other types of portable or fixed dispensers are known and usable with this invention.

Figure 2:
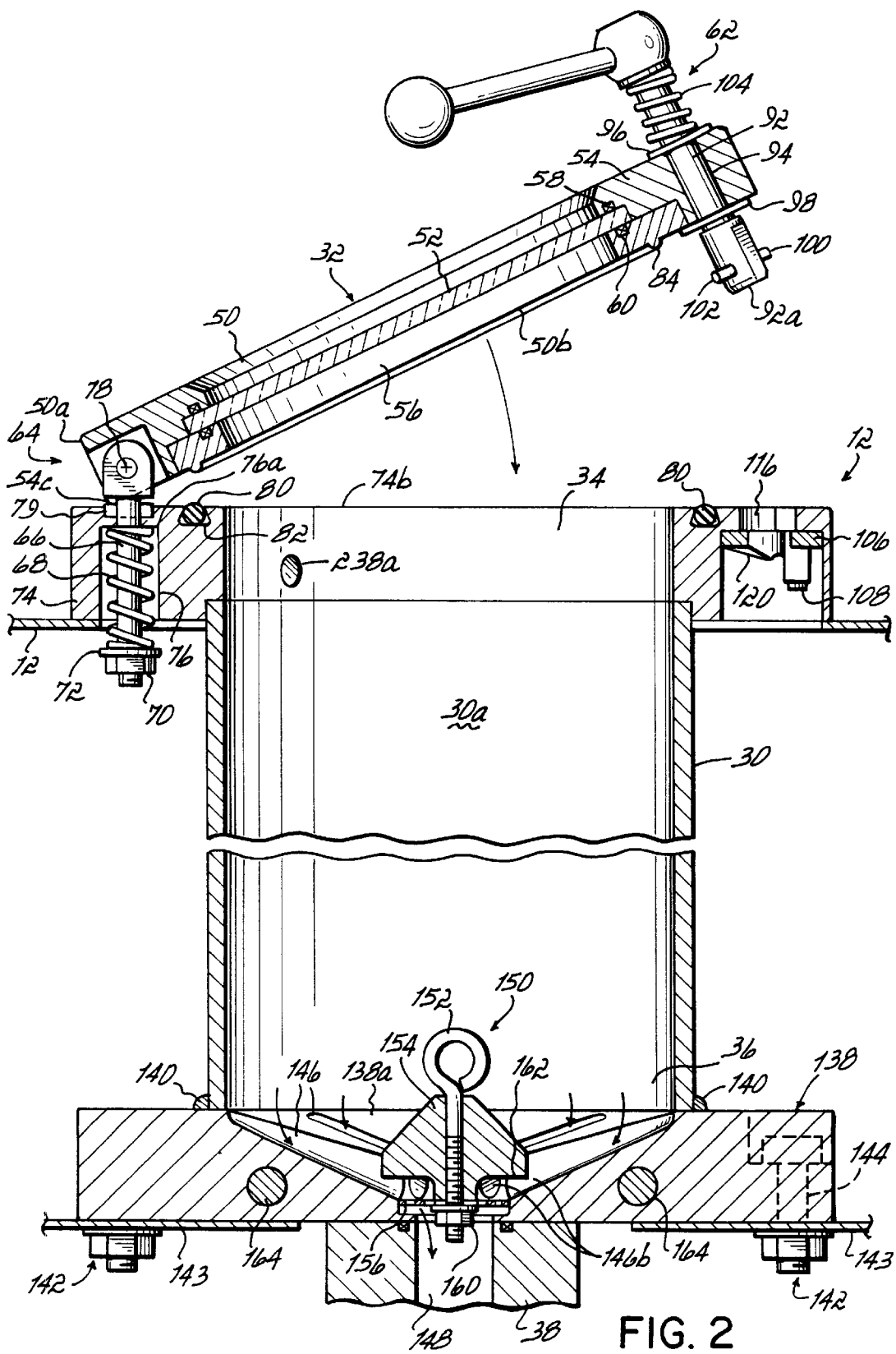
FIG. 2 is a fragmented, longitudinal cross sectional view taken along line 2—2 of FIG. 1.

Referring now more specifically to FIGS. 1 and 2, a hopper 30 is provided within the melting and dispensing unit 12 for receiving solid thermoplastic material, such as a cylindrical slug of PUR hot melt adhesive material. A lid assembly 32 is connected proximate an open end 34 of hopper 30 for providing access to hopper interior 30a and for sealing the same during operation. Hopper 30 further includes a lower end 36 for melting the solid thermoplastic material, as will be described. As further shown in FIG. 1, melting and dispensing unit 12 further comprises a conventional gear pump 38 for receiving melted thermoplastic material from hopper 30. Gear pump 38 preferably operates at about 100–350 psi and displaces from 0.450–0.675 in$^3$/rev. Further, a motor 40 is connected to gear pump 38 for operating gear pump 38 to pump liquid thermoplastic material into a connected flow control block 42. Motor 40 is preferably a ⅙ hp motor operating at 86 rpm and 115/230 vac. As also generally shown in FIG. 1, flow control block 42 further includes an outlet 44 which is preferably connected for fluid communication with hose 16 and a pressure release valve 46 which will be described in conjunction with flow control block 42 hereinafter in detail. Preferably, all appropriate interior and exterior hopper surfaces are coated with a non-stick coating, such as TEMPCOAT, available from Impreglon in Fairburn, Ga.

Figure 3:
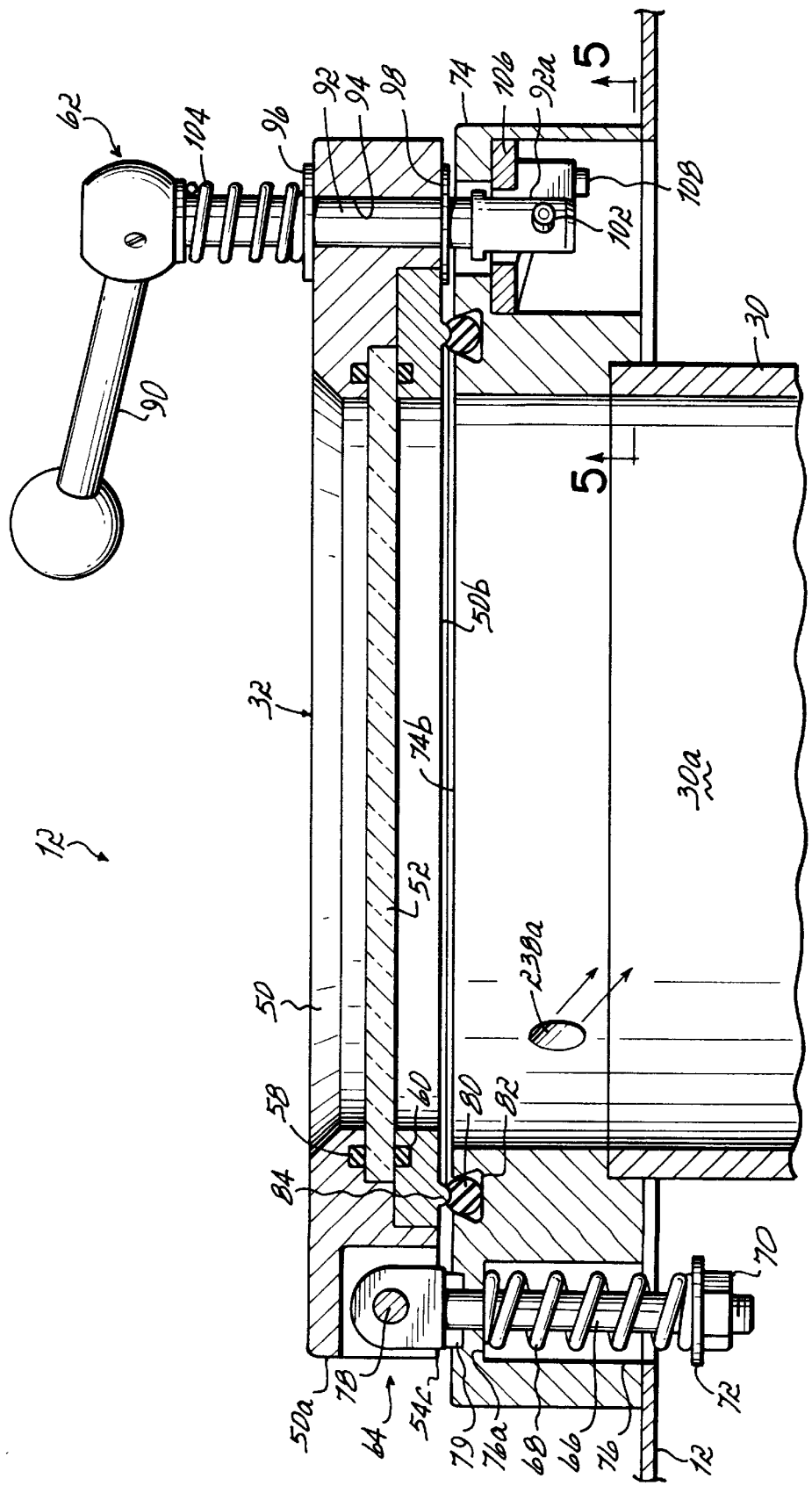
FIG. 3 is an enlarged view of the lid assembly as generally shown in FIG. 2, but with the lid shown in a closed position.

Now referring to FIGS. 1–3 in more detail, lid assembly 32 includes a hinged lid 50 which may be moved between a fully closed and sealed position shown in FIG. 3 and a fully opened position shown in FIG. 1. Hinged lid 50 includes a window 52 which an operator may use to assess the condition of hopper interior 30a, such as assessing the amount of thermoplastic material therein. Window 52 is mounted within a lid frame 54 and retained in place by a ring 56. It will be understood that lid 50, including lid frame 54 and ring 56 are shown as circular, but may take the form of other shapes such as square shapes. Respective seals 58, 60 form appropriate airtight seals between window 52 and lid frame 54 on one side and ring 56 on the opposite side. Lid assembly 32 further includes a latch assembly 62 and a hinge assembly 64 which preferably each provide venting capability to lid assembly 32 in a predetermined over pressure condition within interior 30a. Such an over pressure condition might be from about 3 psi to about 5 psi gas pressure within interior 30a as will be described below.

As shown in FIGS. 2 and 3, hinge assembly 64 is preferably a spring-loaded hinge assembly which allows lid 50 to move slightly upwardly to a venting position. Specifically, hinge assembly 64 includes at least one and preferably two vertically oriented, spring-loaded pins 66, although only one pin 66 is shown in the drawings. A coil spring 68 with a compressed length of 0.99 in., an uncompressed length of 1.19 in., and a spring force of 228 lb./in. is preferably connected to each pin 66 in the manner shown. In this regard, a nut 70 and washer 72 retain spring 68 at one end and a stationary lid mounting portion 74 retains spring 68 on the opposite end. As shown in FIGS. 2 and 3, a recess 76 accepts spring 68 and includes an upper interior surface 76a for retaining the end of spring 68. Spring 68 is therefore compressed between washer 72 and surface 76*a*. Spring-loaded pins 66 are preferably connected to a horizontally disposed pivot pin 78 which is connected to lid 50. Another advantage of spring-loaded hinge assembly 64 is that in the fully opened position shown in FIG. 1, a rear edge surface 50*a* is held down firmly against a low friction pad 79 on upper surface 74*b* of lid mounting portion 74. This holds lid 50 firmly in an upright opened condition, for example, during loading of hopper 30 with thermoplastic material. Pad 79 is a PTFE pad and is provided as a wear surface for a rounded rear edge 54*c* of lid frame 54 during opening and closing over-center movements. As further shown in FIGS. 2 and 3, a resilient seal 80 is contained within a recess 82 surrounding opening 34. This resilient seal 80 is engaged by a raised sealing element 84 correspondingly disposed on a replaceable ring 56 of lid 50. Ring 56 is preferably attached to lid frame 54 by screw fasteners (not shown). This raised sealing element 84 may simply be a machined, annular bead. From a review of FIG. 3, it will be appreciated that this sealing structure provides increasing sealing pressure and maintains opposed surfaces 50*b*, 74*b* of lid 50 and lid mounting portion 74 in spaced apart relation, except for the engagement between resilient seal 80 and raised sealing element 84. Thus, material or debris, such as excess or cured thermoplastic material, on these spaced apart surfaces will not likely compromise the seal. While mounting portion 74 is shown resting on structure of unit 12 in FIGS. 2 and 3, it will be appreciated that this structure may abut the slide wall of portion 74 with a seal 75 as shown in FIG. 1. This can allow hopper 30 and its attachments to be lifted out of unit 12 for maintenance.

Figure 4A:
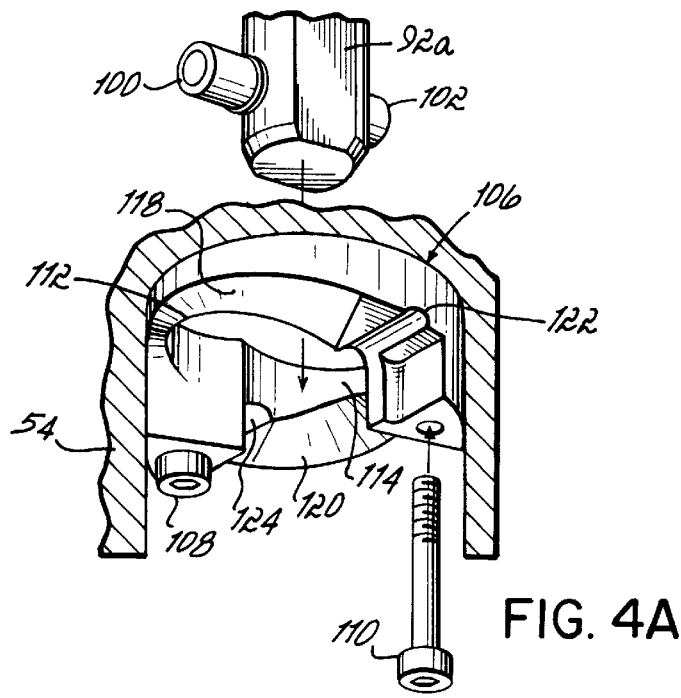
FIGS. 4A–4C are perspective views generally showing the sequence of latching the lid assembly.
Figure 4B:
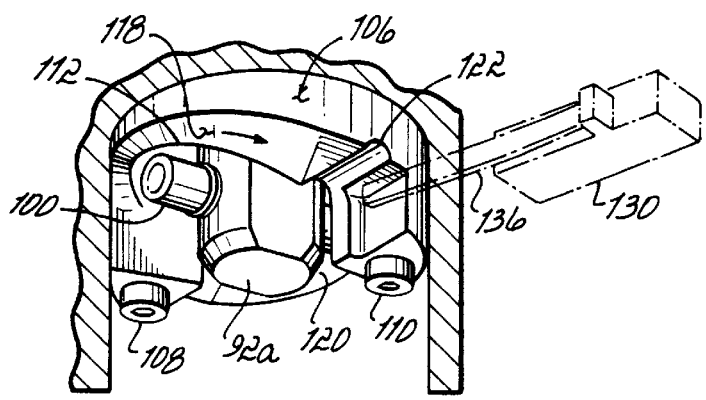
Figure 4C:
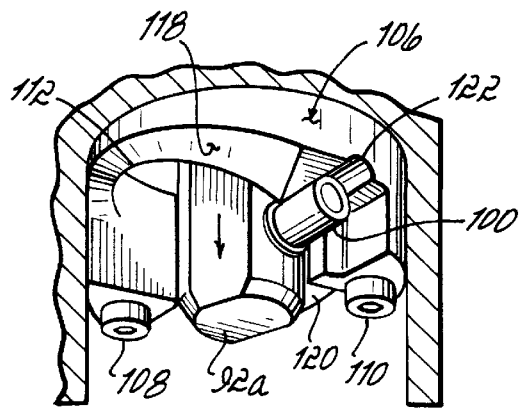

Still referring to FIGS. 2 and 3, latch assembly 62 more specifically comprises a handle 90 rigidly connected to a shaft 92 which is received for rotation within a bore 94 contained within lid frame 54. Flat washers 96, 98 provide a wear surface between coil spring 104, shaft 92 and lid 50. A lower end of shaft 92 includes a portion with oppositely extending roller pins 100, 102 while an upper portion of shaft 92 receives a coil spring 104. Again, coil spring 104 is provided for pressure relief purposes and, under appropriate over pressure conditions within hopper interior 30*a*, coil spring 104 will allow lid 50 to move slightly upwardly into a venting position. In the venting position, sealing element 84 will disengage from seal 80. Preferably, spring 104 has an uncompressed length of 1.00 in., a compressed length of 0.66 in. and a spring force of 270 lb./in. It will be understood by those of ordinary skill that these spring-loaded latch and hinge assemblies 62, 64 may be designed with other components specific to the particular apparatus and application conditions. A cam latching element 106 is rigidly affixed to lid mounting portion 74 by fasteners 108, 110, as best shown in FIGS. 4A–4C. As further appreciated from a review of FIGS. 4A–4C and FIG. 5, a pair of oppositely extending slots 112, 114 are provided for initially receiving roller pins 100, 102 as lid 50 is moved to the closed position. Roller pins 100, 102 may be connected to shaft portion 92*a* in any conventional manner and serve to reduce friction during the latching operation. Each slot 112, 114 extends away from a central bore 116 which receives end portion 92*a* of shaft 92. Then, as shown in FIGS. 4B and 4C, as handle 90 and shaft 92 are rotated approximately 120°, roller pins 100, 102 will move along respective curved cam surfaces 118, 120 and lock into respective detents or grooves 122, 124. Coil spring 104 also assists with smooth movement along cam surfaces 118, 120 and locking of roller pins 100, 102 within detents or grooves 122, 124 by pulling upwardly on shaft 92. This action also tightens the seal formed between elements 80 and 84. As specifically shown in FIG. 5, a microswitch 130 is mounted adjacent cam latch element 106 and includes respective electrical leads 132 connected to a gas purge control system, as will be described. Microswitch 130 may be mounted with suitable fasteners 134, as shown, with an actuating arm 136 extending into cam latch element 106. In the locked position of latch assembly 62, roller pin 100 will move actuating arm 136 to close switch 130. This will begin the gas purge cycle in a manner to be described below.

Figure 6:
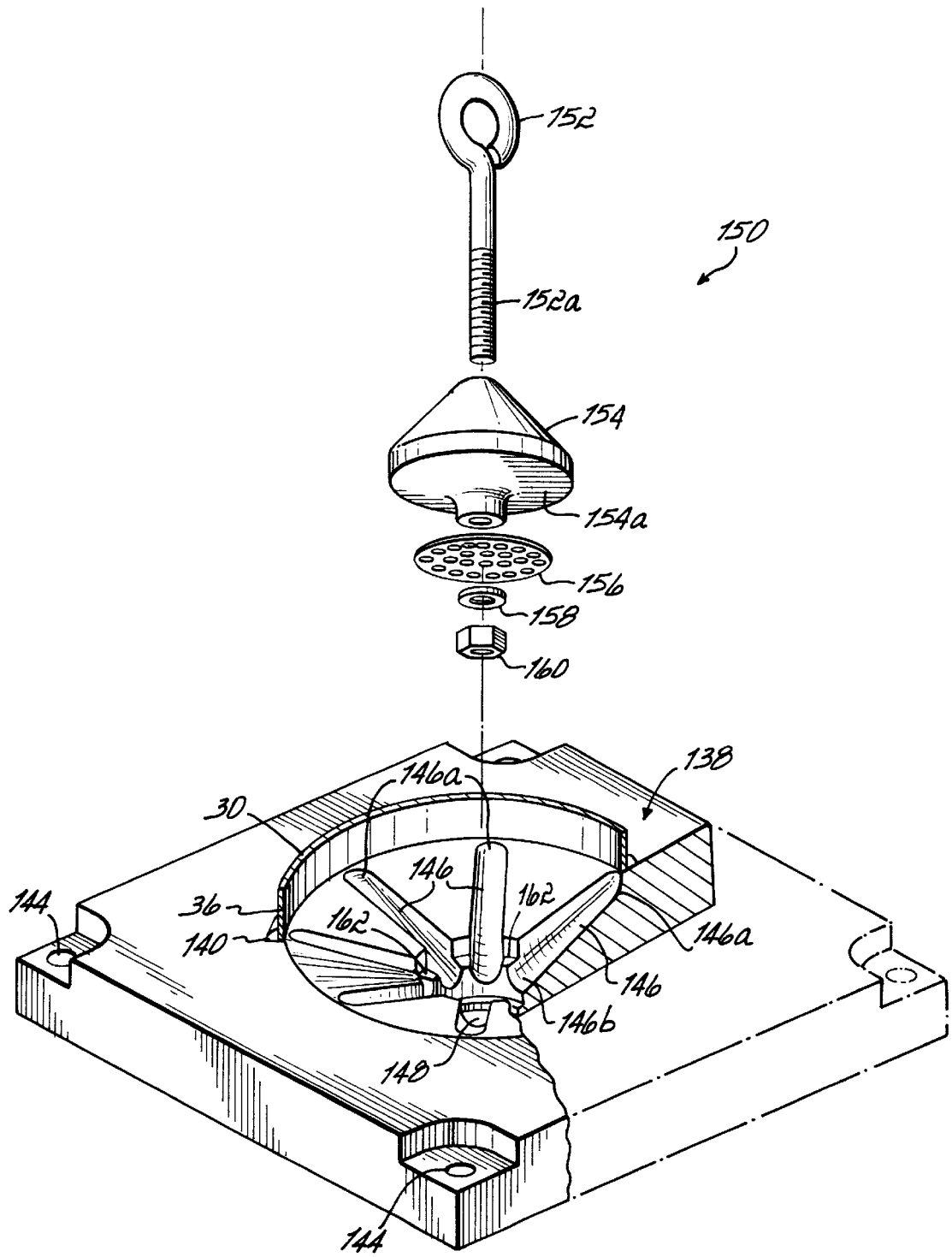
FIG. 6 is an exploded perspective view of the melting grid associated with the apparatus of the present invention.

Referring to FIGS. 2 and 6, hopper 30 is preferably rigidly affixed to a melting grid 138, such as by welding 140. Threaded fastener assemblies 142 extending through holes 144 are then preferably used to affix the entire assembly to other mounting structure 143 of melting and dispensing unit 12. As another aspect of this invention, melting grid 138 includes an upper sloped surface 138*a* which has generally radially extending recesses or grooves 146 sloping downwardly toward a central outlet 148. Recesses or grooves 146 include outer ends 146*a* and inner ends 146*b* that communicate with outlet 148. Recesses or grooves 146 may taper in depth from outer ends 146*a* to inner ends 146*b* so as to be deeper at outlet 148. A plug assembly 150 is provided for insertion within outlet 148 in a manner that still allows flow of melted thermoplastic material into outlet 148 but keeps unmelted thermoplastic material from blocking outlet 148. Plug assembly 150 specifically includes an eye bolt 152 which receives a conical member 154, a filter plate or screen element 156, and a washer and nut assembly 158, 160 threaded onto an end 152*a* of eye bolt 152 to retain the assembly as shown in FIG. 2. The plug assembly 150 is inserted into outlet 148 such that a lower surface 154*a* of conical member 154 rests on a step or shoulder 162 formed within outlet 148. From a review of FIG. 2, it will be appreciated that step or shoulder 162 is formed above the bottoms of recesses or grooves 146 and, therefore, melted thermoplastic material can flow beneath conical member 154 into outlet 148. As further shown in FIG. 2, a pair of cartridge heaters 164 may be used, in a conventional manner, to heat melting grid 138.

Figure 7:
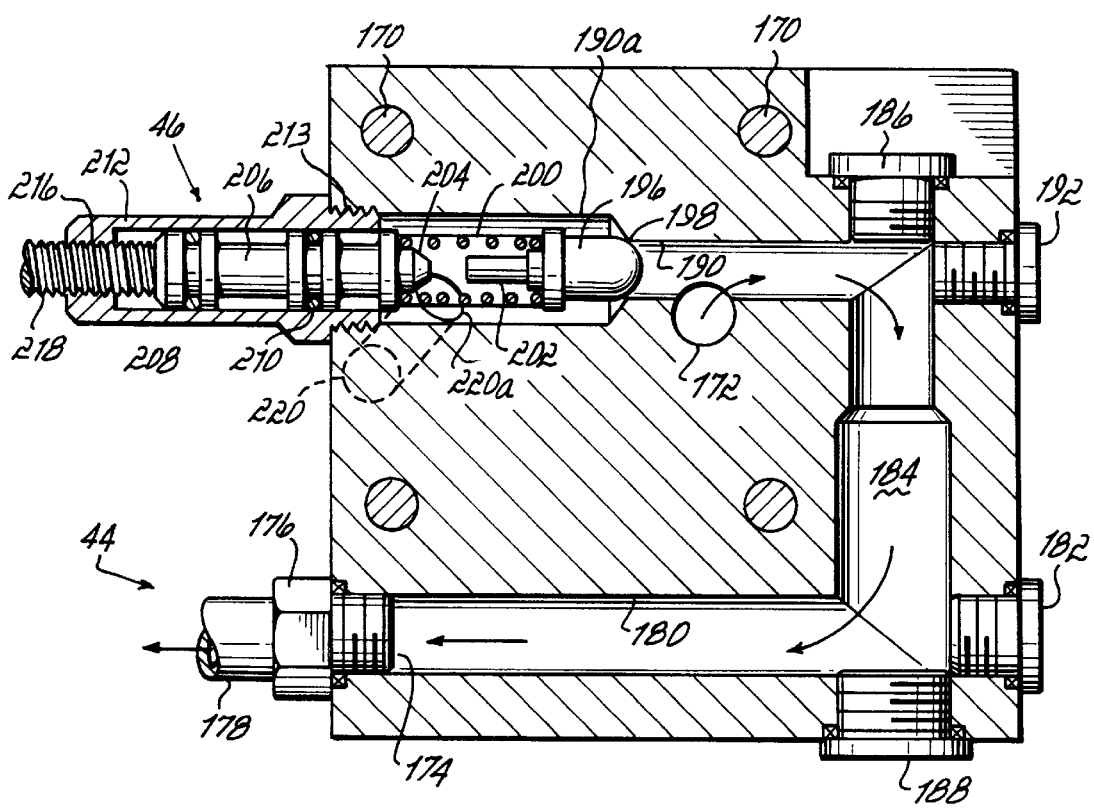
FIG. 7 is a cross sectional view of a flow control plate associated with the present invention and generally taken along line 7—7 of FIG. 1.

Flow control block 42, as initially discussed with respect to FIG. 1, is shown in more detail in FIG. 7. In this regard, flow control block 42 is preferably mounted by fastener 170 to gear pump 38 (FIG. 1). This mounting is accomplished such that an outlet (not shown) of gear pump 38 communicates with an outlet 172 of flow control block 42. Outlet passage 172 is preferably a throughbore and may be plugged at one end. The main purpose of flow control block 42 is not only to deliver melted thermoplastic material to an outlet 174, and ultimately to gun 18, but to also provide pressure relief to control the adhesive pressure available to gun 18. Outlet 174 may conventionally include a suitable fluid connector 176 and conduit 178 connected to hose 16 (FIG. 1). Outlet 174 is formed as part of a through passage 180 which may be plugged at one end with a sealing plug member 182. Plug 182 may optionally be eliminated and therefore open a second outlet to use with a second dispenser. A second through passage 184, sealed at each end by plug members 186, 188 connects outlet passage 180 to another through passage 190 which communicates with inlet passage 172. If desired, a filter (not shown) may replace plug 188. Passage 190 is also a through passage which is preferably plugged at one end using a plug member 192 and which receives pressure relief valve 46 within an opposite end. Pressure relief valve 46 includes a valve portion 196 that engages a valve seat 198 formed within a portion 190*a* of passage 190. A spring 200 is connected to valve portion 196 to normally retain valve portion 196 against valve seat 198 and to allow movement of valve portion 196 away from valve seat 198 to control the available adhesive pressure. The specific pressure control and therefore the spring characteristics of this portion of pressure relief valve 46 will depend on the specific application requirements. More specifically, spring 200 receives a stem 202 which may engage a stop member 204 if valve portion 196 moves to this full open condition. An adjustment member 206 is provided for adjusting the amount of spring force applied against valve portion 196. This may therefore be used to adjust pressure relief valve 46 to open at different liquid pressures within passage 190. Respective O-rings 208, 210 allow adjustment member 206 to slide with a piston-like movement within a housing portion 212. Housing portion 212 is rigidly affixed within flow control block 42, and specifically within portion 190a of passage 190 by threads 214. Internal threads 216 are disposed at the opposite end of housing 212 and receive a threaded member 218 which is used to move adjustment member 206 in the manner described above. A bypass port 220 is contained within flow control block 42 and includes an end 220a communicating with passage 190a. This end 220a is disposed proximate to the end of passage 190a opposite valve seat 198 to ensure that each time pressure relief valve is opened, passage 190a will be substantially flushed with liquid material, i.e., so that there is as little dead space as possible within passage 190a. Bypass portion 220 is preferably connected to the inlet of gear pump 38 (FIG. 1).

Figure 8:
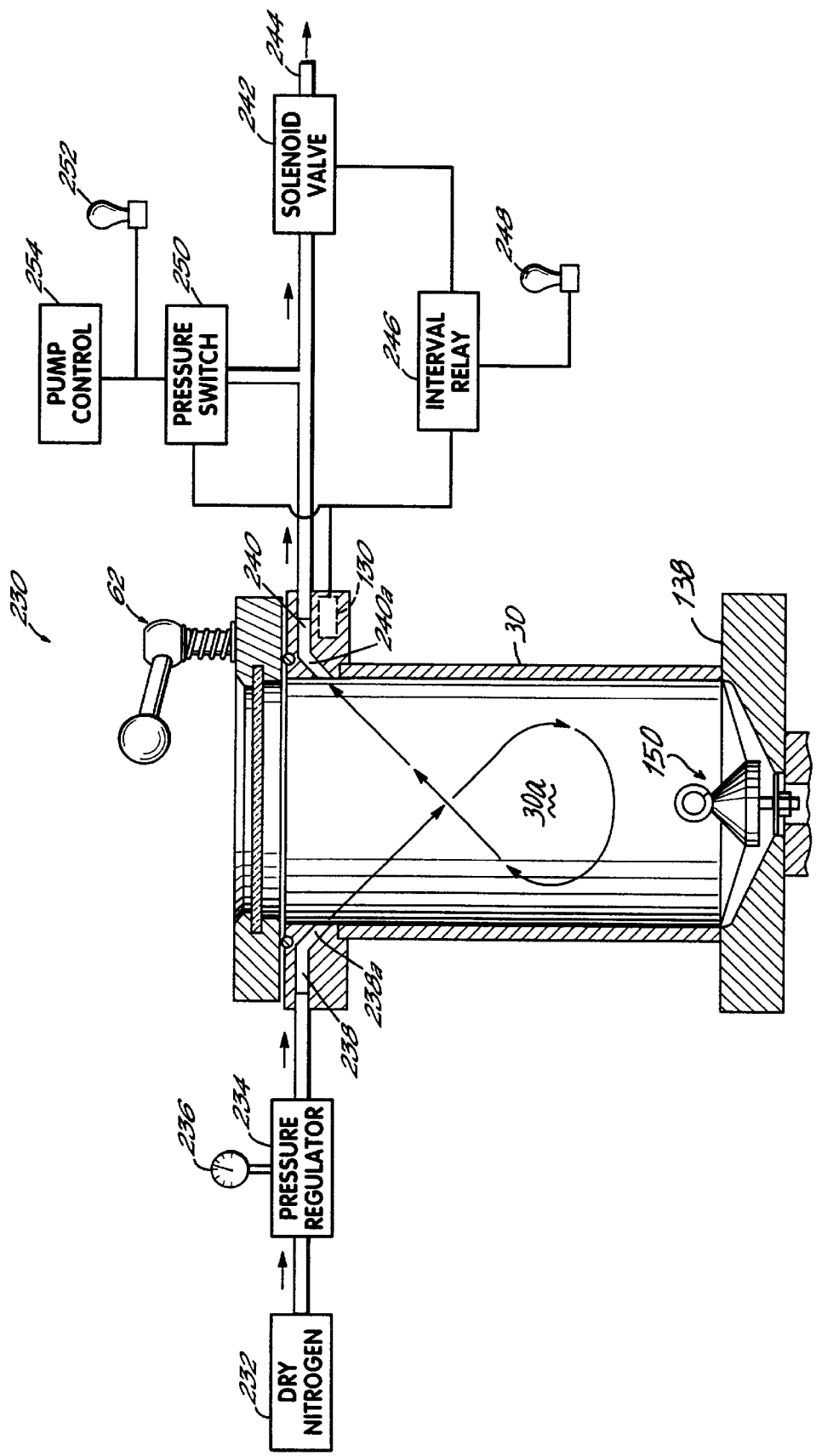
FIG. 8 is a schematic diagram of a gas purge system associated with the preferred embodiment of the invention.

FIG. 8 illustrates, in a schematic manner, a gas purge system 230 of the present invention useful for providing a controlled gaseous environment in hopper 30. This gas purge system is especially useful for maintaining hopper interior 30a substantially free of moisture as is especially desirable in the case of handling PUR hot melt adhesives. It is contemplated, however, that such a gas purge system may be useful in other instances where it is desirable to circulate a gas within the interior of a hopper adapted to hold and melt thermoplastic material.

Specifically, gas purge system 230 may include a tank 232 of inert gas, such as dry nitrogen, connected to a pressure regulator 234 having a conventional gauge 236. This pressure regulator may be used to ensure that a constant supply of gas at, for example, 2 psi is directed into an inlet 238 of hopper 30. Also in accordance with the invention, at least the portion 238a of inlet 238 which communicates with hopper interior 30a is angled downwardly preferably at about 45°. Likewise, at least a portion 240a of a gas outlet 240 communicating with hopper interior 30a may also be angled downwardly. This helps ensure that gas is well circulated within hopper interior 30a as schematically shown in FIG. 8, as opposed to short circuiting hopper interior 30a and traveling more directly from inlet 238 to outlet 240. Portions 238a and 240a may be enlarged relative to the other portions of outlets 238, 240 to help prevent clogging by thermoplastic material. Outlet 240 is connected to a solenoid valve 242, which may be a conventional electromagnetically operated two-way solenoid valve. When opened, valve 242 exhausts gas in the system to atmosphere through an exhaust port 244. A time interval relay 246 is connected to solenoid valve 242 and is also operatively connected to microswitch 130. When microswitch 130 detects that lid 50 has been closed and sealed with latch assembly 62 as previously discussed, interval relay causes solenoid valve to open and to exhaust nitrogen and, more importantly, other moisture-laden air from hopper interior 30a. This open interval may last for 10–30 seconds. Preferably, system 230 is designed to complete at least one full exchange of air, and most preferably two exchanges of air in hopper interior 30a, during each purge cycle. An indicator light 248 may be provided on a control panel to indicate to the operator when this gas purge cycle is operating. A pressure switch 250 may also be connected for communication with gas outlet 240 to indicate a low pressure condition, such as a condition in which the supply 232 of nitrogen is empty or lid 50 is open as detected by an open condition of microswitch 130. In these conditions, pressure switch 250 causes a pump control 254 to stop the operation of gear pump 38, as by stopping motor 40 (FIG. 1). Optionally, operation of apparatus 10 may be completely shut down. Again, an indicator light 254, or some other indicator, may also be connected with pressure switch 250 to indicate this condition to the operator. Pressure switch is advantageously connected to outlet 240 as opposed to inlet 238, for example, so that even if inlet 238 is clogged with thermoplastic material, a low pressure condition can be detected in hopper interior 30a. If outlet 240 is clogged, then a no pressure condition will be detected and indicated, for example, by light 252 and pump 38 may be stopped by control 252. Pressure switch 250 is preferably set to activate at 1.25 psi. Also, when lid 50 is open, the supply 232 of nitrogen is preferably maintained to hopper interior 30a to help prevent a significant build-up of moisture.

Figure 5:
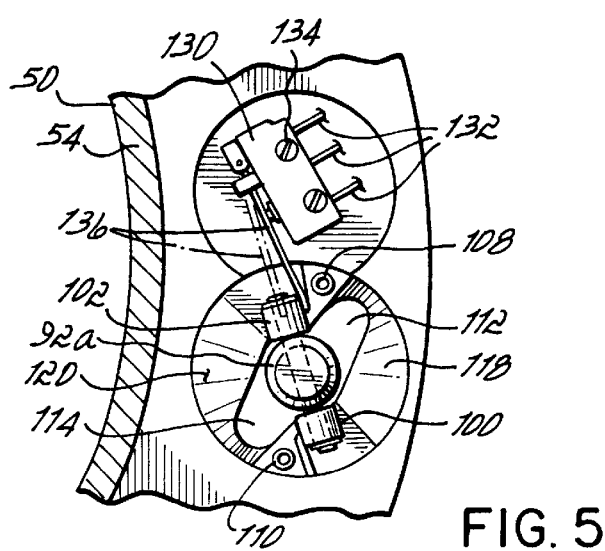
FIG. 5 is a view of the lid latch assembly and associated microswitch used in the preferred embodiment and generally taken along line 5—5 of FIG. 3.

In use, an operator loads a cylindrical slug of thermoplastic material, such as PUR adhesive, into hopper 30 when lid 50 is in the position shown in FIG. 1. When lid 50 is closed and latched, microswitch 130 will be actuated as shown in FIG. 5 and a gas purge cycle will be initiated in accordance with the description given with reference to FIG. 8. Specifically, nitrogen gas will be injected through inlet 238 at a low, regulated pressure of 2 psi. Microswitch 130 will initiate operation of interval relay 246 to open solenoid valve 242 for 30 seconds such that the nitrogen gas is circulated fully through hopper interior 30a, as shown, and through exhaust 244. At this point, solenoid valve may be closed during a dispensing operation. Referring to FIG. 2, cartridge heaters 164 are activated to heat melting grid 138 and melt the slug of thermoplastic material (not shown). Melted thermoplastic material will flow through recesses 146 and into outlet 148 to gear pump 38 (FIG. 1). As further shown in FIG. 1, an operator may then use a dispensing gun 18 to dispense the adhesive as necessary. To control the pressure of the melted thermoplastic material being dispensed from pump 38, pressure relief valve 46, as shown in FIG. 7, can open and recirculate thermoplastic material back to pump 38 through a relief port 220. In the event of a low pressure gas condition within hopper interior 30a, such as if lid 50 is opened, or gas supply 232 is depleted, pressure switch 250 will activate and at least shut down pump 38 through a pump control 254. This condition may also be indicated to the operator by activating indicator light 252 and/or with a sound indicator (not shown). While this is the basic operation of apparatus 10, additional aspects of the operation and the advantages of the invention are apparent from the foregoing description.

While the present invention has been illustrated by a description of the preferred embodiment and while this embodiment has been described in considerable detail, it is not the intention of the Applicants to restrict or in any way limit the scope of the appended claims to such detail. As only one example, hopper 30 need not be a unitary or integral structure, such as the cylindrical unit shown. The term hopper is intended to broadly define a receiving structure for melting and conveying thermoplastic material to an outlet. Additional advantages and modifications will readily appear to those skilled in the art. The invention in its broader aspects is therefore not limited to the specific details, representative apparatus and methods as shown and described.

The invention itself should only be defined by the appended claims, wherein we claim:

1. Thermoplastic material melting and dispensing apparatus comprising:
   a hopper having an open upper end for receiving thermoplastic material to be melted and a lower end including a thermoplastic material outlet for discharging melted thermoplastic material,
   a heating element disposed generally at the lower end of the hopper for melting the thermoplastic material,
   a lid mounted adjacent the open end of the hopper and movable between an open position suitable for loading the thermoplastic material into the hopper and a closed position for melting and dispensing the thermoplastic material, and
   pressure release structure connected with the lid and operative to allow movement of at least a portion of the lid to a venting position to release a build-up of gas pressure from within the hopper, and
   a gas purging system, wherein the gas purging system comprises:
      a gas inlet and a gas outlet communicating with an air space in an upper interior portion of the hopper, and
      a pressure sensing device connected to the gas outlet for sensing a pressure of the gas with the upper interior portion of the hopper.

2. The apparatus of claim 1 further comprising:
   a gas flow regulating device connected to the gas purging system for regulating gas flow within the air space.

3. The apparatus of claim 2, further comprising a switch operatively connected to the gas flow regulating device and activated when the lid is in the closed position to begin a gas purging operation of the hopper.

4. The apparatus of claim 2, wherein the gas flow regulating device includes a valve which is opened to allow gas to flow through the air space.

5. Thermoplastic material melting and dispensing apparatus comprising:
   a hopper having an open upper end for receiving thermoplastic material to be melted and a lower end including a thermoplastic material outlet for discharging melted thermoplastic material,
   a heating element disposed generally at the lower end of the hopper for melting the thermoplastic material,
   a lid mounted adjacent the open end of the hopper and movable between an open position suitable for loading the thermoplastic material into the hopper and a closed position for melting and dispensing the thermoplastic material, said lid further including a window for determining the amount of thermoplastic material in the hopper, and
   pressure release structure connected with the lid and operative to allow movement of at least a portion of the lid to a venting position to release a build-up of gas pressure from within the hopper.

6. The apparatus of claim 5, wherein the pressure release structure includes at least one of a spring-loaded hinge assembly and a spring-loaded lid latch assembly for allowing the lid to move to the venting position.

7. The apparatus of claim 5, wherein the lid is secured by a hinge to a stationary mounting portion, the lid including an underside and the stationary mounting portion having an upperside, and one of the underside and the upperside includes a raised sealing element disposed around the opening of the hopper to prevent contact between other opposed surfaces of the lid underside and mounting portion upperside.

8. The apparatus of claim 7, wherein the raised sealing element is disposed on the underside of the lid.

9. The apparatus of claim 8, wherein the raised sealing element is formed as a replaceable portion of the lid.

10. The apparatus of claim 5, wherein the heating element includes a melting grid having an upper surface adapted to receive a slug of thermoplastic material and sloped downwardly toward the thermoplastic material outlet, the upper surface further including a plurality of recesses having inner ends which communicate with the thermoplastic material outlet for directing melted thermoplastic material out of the hopper.

11. The apparatus of claim 10 further comprising a plug member disposed in the thermoplastic material outlet above the inner ends of the recesses such that the recesses communicate with the thermoplastic material outlet and the plug can transfer heat to the slug of thermoplastic material and maintain unmelted thermoplastic material substantially out of the thermoplastic material outlet.

12. The apparatus of claim 11, wherein a filtering member is attached to the plug member and is contained in the outlet for filtering the melted thermoplastic material flowing through the outlet.

13. Thermoplastic material melting and dispensing apparatus comprising:
   a hopper having an open upper end for receiving thermoplastic material to be melted and a lower end including a thermoplastic material outlet for discharging melted thermoplastic material,
   a heating element disposed generally at the lower end of the hopper for melting the thermoplastic material,
   a lid mounted adjacent the open end of the hopper and movable between an open position suitable for loading the thermoplastic material into the hopper and a closed position for melting and dispensing the thermoplastic material, and
   a gas purging system operatively connected to the hopper interior, the gas purging system including a gas inlet communicating with the hopper interior and a gas outlet connected to a gas flow regulating device, the gas flow regulating device being further connected to a control for selectively allowing gas to flow from the hopper interior through the gas flow regulating device, whereby a supply of pressurized gas may be connected to the gas inlet and flow of the pressurized gas through the hopper interior may be controlled by the gas flow regulating device,
   wherein the gas purging system further includes a pressure sensing device operatively connected to the gas outlet for indicating a low pressure condition within the hopper interior.

14. The apparatus of claim 13 further comprising a pump for pumping melted thermoplastic material from the hopper, and a pump control operatively connected to the pressure sensing device, wherein the pump control operates to stop operation of the pump in the event that the pressure sensing device indicates the low pressure condition.

15. The apparatus of claim 13, wherein the gas inlet and gas outlet comprise passages angled away from each other.

16. The apparatus of claim 15, wherein at least the gas inlet is angled downward to promote full circulation of gas within the hopper.

17. A method of providing a controlled gaseous environment within a hopper associated with a hot melt unit while melting solid thermoplastic material, the method comprising the steps of:

sealing the solid thermoplastic material within the hopper while leaving an air space therein, said air space communicating with a gas inlet and a gas outlet, constantly introducing a pressurized gas into the hopper through the gas inlet, monitoring the pressure of the gas contained within the hopper with a pressure sensing device connected to the gas outlet, and providing an indication to an operator when the pressure is at a predetermined amount.

18. The method of claim 17, wherein the gas inlet and gas outlet are angled away from each other to promote complete circulation of the gas within the air space.

19. The method of claim 17, further comprising the step of operating a flow regulating device connected to the gas outlet to circulate the gas through the gas inlet, the air space, and the gas outlet.

20. The method of claim 17, wherein pressure release structure is connected to a lid of the hopper, and the pressure release structure moves at least a portion of the lid to a venting position at a pressure above the predetermined pressure.

21. The method of claim 17, wherein the monitoring step is performed by a pressure switch connected to the gas outlet.

22. Thermoplastic material melting and dispensing apparatus comprising:

a hopper having an open upper end for receiving thermoplastic material to be melted and a lower end including a thermoplastic material outlet for discharging melted thermoplastic material, a lid mounted adjacent the open end of the hopper and movable between an open position suitable for loading the thermoplastic material into the hopper and a closed position for melting and dispensing the thermoplastic material, a melting grid disposed in the lower end of the hopper, the melting grid including an upper, flat surface portion sloping downward toward the thermoplastic material outlet and a plurality of recesses in the flat surface, the recesses including lower ends communicating with the thermoplastic material outlet, and a plug disposed in the outlet so as to prevent clogging of the thermoplastic material outlet by solid thermoplastic material but to allow movement of melted thermoplastic material from the lower ends of the recesses into the thermoplastic material outlet.

23. The apparatus of claim 22, wherein the recesses taper in depth from upper ends thereof to the lower ends thereof so as to be deeper at the lower ends.

24. The apparatus of claim 23 further comprising a filter connected to the plug and disposed within the outlet and generally below the lower ends of the recesses for filtering the melted thermoplastic material flowing from the recesses into the outlet.

25. The apparatus of claim 23, wherein the outlet is substantially centered with the hopper and the plug extends upwardly to engage a central bottom area of a slug of thermoplastic material contained in the hopper to thereby transfer heat from the melting grid to the slug of thermoplastic material.

26. Thermoplastic material melting and dispensing apparatus comprising:

a hopper having an open upper end for receiving thermoplastic material to be melted and a lower end including a thermoplastic material outlet for discharging melted thermoplastic material, a heating element disposed generally at the lower end of the hopper for melting the thermoplastic material, a lid mounted adjacent the open end of the hopper and movable between an open position suitable for loading the thermoplastic material into the hopper and a closed position for melting and dispensing the thermoplastic material, and a gas purging system operatively connected to the hopper interior, the gas purging system including a gas inlet communicating with the hopper interior and a gas outlet connected to a gas pressure sensing device, the gas pressure sensing device being further connected to a control for indicating a low gas pressure condition to an operator.

27. The apparatus of claim 26, wherein the control includes a pump control which stops the operation of a pump connected with the thermoplastic material outlet.

28. The apparatus of claim 26, wherein the control further includes an indicator light.

29. Thermoplastic material melting and dispensing apparatus comprising:

a hopper having an open upper end for receiving thermoplastic material to be melted and a lower end including a thermoplastic material outlet for discharging melted thermoplastic material, a lid mounted adjacent the open end of the hopper and movable between an open position suitable for loading the thermoplastic material into the hopper and a closed position for melting and dispensing the thermoplastic material, pressure release structure connected with the lid and operative to allow movement of at least a portion of the lid to a venting position to release a build-up of gas pressure from within the hopper, a melting grid disposed in the lower end of the hopper, the melting grid including an upper, flat surface portion sloping downward toward the thermoplastic material outlet and a plurality of recesses in the flat surface, the recesses including lower ends communicating with the thermoplastic material outlet, a plug disposed in the outlet so as to prevent clogging of the thermoplastic material outlet by solid thermoplastic material but to allow movement of melted thermoplastic material from the lower ends of the recesses into the thermoplastic material outlet, and a gas purging system operatively connected to the hopper interior, the gas purging system including a gas inlet communicating with the hopper interior and a gas outlet connected to a gas flow regulating device, the gas flow regulating device being further connected to a control for selectively allowing gas to flow from the hopper interior through the gas flow regulating device, whereby a supply of pressurized gas may be connected to the gas inlet and flow of the pressurized gas through the hopper interior may be controlled by the gas flow regulating device, and the gas purging system further including a pressure sensing device connected to the gas outlet and connected with a control for indicating a low gas pressure condition to an operator.

30. The apparatus of claim 29 further comprising:

a flow control block operatively connected to the thermoplastic material outlet, said flow control block including a plurality of through passages therein for defining a flow path with selected ends of said through passages being plugged, and further including a pressure relief valve disposed within one of said through passages.

* * * * *